Patented Feb. 6, 1951

UNITED STATES PATENT OFFICE 2,540,988

2,540,988
4-KETO-1,3-BENZODIOXANE DERIVATIVES

David T. Mowry, Dayton, Ohio, assignor to Monsanto Chemical Company, St. Louis, Mo., a corporation of Delaware No Drawing. Application June 19, 1946,
Serial No. 677,911

5 Claims. (Cl. 260—338)

This invention relates to the preparation of benzodioxane products having the general formula:

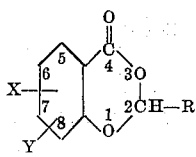

where R is $CH_2=CH-$, $CH_3CH=CH-$, styryl, phenyl, chlorophenyl, dichlorophenyl, nitrophenyl, methylene dioxyphenyl and furyl; X is H, Cl, $CH_3$, $NO_2$, $OCH_3$; Y is H and $CH_3$ and X and Y together are benzo.

The scheme for numbering substituents is indicated in the above structural formula.

The present products are useful as insecticides or as ingredients of insecticidal products.

The present products may be produced by reacting a salicylate having the general formula:

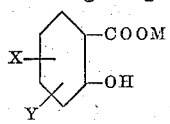

where X and Y have the significance explained above and M is a salt forming metal or hydrogen with an acetic acid ester having the formula:

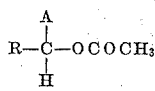

where A is an acid residue selected from the group consisting of Cl and $OCOCH_3$; and R has the significance explained above.

The reaction is carried on in general by refluxing the acid or a salt of the hydroxy aromatic acid with the ester.

Temperatures necessary for carrying out the reaction may range from the boiling temperature of the reaction mixture at normal atmospheric pressure to higher temperatures. Higher reaction temperatures may be obtained by increasing the pressure upon the boiling mixture. In this way, the time of reaction may be considerably shortened.

In general I have found that two types of acetic acid esters may be used in the practice of my invention. One of these esters may be considered as the diacetate of the hypothetic alcohol:

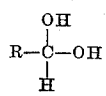

where R has the significance explained above and the other as the chloride acetate of this alcohol.

The invention is illustrated by the following examples:

EXAMPLE 1

*Salicylic acid-aldehyde diacetate reactions.*— The preparation of 2-phenyl-4-keto-1,3-benzodioxane is typical of these reactions.

A mixture of 104 g. of salicylic acid (0.75 mol), 151 g. (0.75 mol) of benzal diacetate, and a solution of 0.2 cc. of sulfuric acid in 50 cc. of glacial acetic acid was placed in a 500 cc. flask. A 50 cm. Vigreux column was attached and the system evacuated to 20-30 mm. pressure and heated by means of a bath maintained at 70°. Acetic acid distilled out of the reaction as formed and the temperature of the bath was then raised to 105° during a period of two hours. At the end of this time 133 g. of acetic acid had been removed. The product was dissolved in ether, washed with dilute solutions of sodium carbonate and sodium bisulfite. The ether was evaporated giving 141 g. (83%) of crude 2-phenyl-4-keto-1,3-benzodioxane, M. P. 55-58°. Two recrystallizations from dilute ethanol gave 120 g., M. P. 60°. With ferric chloride solution the product did not give the violet color characteristic of salicylic acid esters. The 2-phenyl-4-keto-1,3-benzodioxane has the structure:

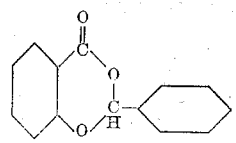

The following table summarizes the chemical data obtained on the various benzodioxanes prepared according to the present invention:

Table

| 4-Keto-1, 3-Benzodioxane | Formula | Yield, Per Cent | B. P., °C./mm. | M. P., °C. | Analyses | | | |
|---|---|---|---|---|---|---|---|---|
| | | | | | Carbon, Per Cent | | Hydrogen, Per Cent | |
| | | | | | Calcd. | Found | Calcd. | Found |
| 2-Methyl- | $C_9H_8O_3$ | 87 | 97–98/1 | 33 | 65.8 | 65.8 | 4.91 | 5.07 |
| 2-Phenyl- | $C_{14}H_{10}O_3$ | 83 | | 60 | 74.4 | 74.6 | 4.46 | 4.63 |
| 2-(o-Chlorophenyl)- | $C_{14}H_9O_3Cl$ | 54 | | 134 | 64.5 | 64.6 | 3.48 | 3.72 |
| 2-(2',6'-Dichlorophenyl)- | $C_{14}H_8O_3Cl_2$ | 38 | | 130 | 56.9 | 57.2 | 2.73 | 3.08 |
| 2-(m-Nitrophenyl)- | $C_{14}H_9O_5N$ | 52 | | 141 | 62.2 | 62.4 | 3.34 | 3.51 |
| 2-(3',4'-Methylenedioxyphenyl)- | $C_{15}H_{10}O_5$ | 48 | | 118 | 66.7 | 66.9 | 3.74 | 3.94 |
| 2-Furyl- | $C_{12}H_8O_4$ | 5 | | 90 | 66.7 | 66.2 | 3.73 | 4.13 |
| 2-Styryl- | $C_{16}H_{12}O_3$ | 66 | | 99 | 76.2 | 76.2 | 4.80 | 4.82 |
| 2-Propenyl- | $C_{11}H_{10}O_3$ | 24 | 150–155/10 | 76 | 69.5 | 69.5 | 5.31 | 5.37 |
| 2-Vinyl- | $C_{10}H_8O_3$ | 5 | 110/2 | 33 | 68.3 | 68.3 | 4.58 | 4.67 |
| 2-(3',4'-Methylenedioxyphenyl)-8-methyl- | $C_{16}H_{12}O_5$ | 79 | | 119 | 67.7 | 67.7 | 4.20 | 4.42 |

EXAMPLE 2

*2-methyl-4-keto-1,3-benzodioxane from alpha-acetoxyethyl salicylate.*—2-chloroethyl acetate, B. P. 112–116°, was prepared by the method of Ulich and Adams, J. Am. Chem. Soc. 43, 660–7 (1921), in 65% yield. One mol (122.5 g.) of this material was refluxed for 50 hours with 160 g. (1.0 mol) of sodium salicylate and 2 g. potassium iodide in 400 cc. of methyl ethyl ketone solvent. The product was poured into several volumes of water and extracted with ether. The ether extract was washed with dilute sodium carbonate, water and dilute hydrochloric acid, and distilled rapidly to give 122 g. of crude product, B. P. 120–130° (2–3 mm.). Careful refractionation at high reflux ratio through a 50 cm. Vigreux column gave 74 g., 33% of pure alpha-acetoxyethyl salicylate, B. P. 106–107° (1.0 mm.) $n_D^{25}$ 1.5072, which gave a typical violet color with ferric chloride solution.

*Anal.:*

Calcd. for $C_{11}H_{12}O_5$: C, 58.9; H, 5.39.
Found: C, 58.79, H, 5.35.

It is obvious that other salts of salicylic acid may be used in place of the sodium salt. Moreover, other solvents such as ethers, dioxanes, other ketones than that employed above may be used.

Substituted salicylic acids such as are disclosed in my copending application, Serial No. 677,910, filed June 19, 1946, now Patent No. 2,510,036, may likewise be employed in the present process.

Examples of substituted salicylic acids are the following:

Chlorosalicylic acid
Bromosalicylic acid
Methyl salicylic acid
Dimethyl salicylic acid
Nitrosalicylic acid
Nitro methylsalicylic acid
Methyl methoxysalicylic acid
Methoxysalicylic acid
2-hydroxy-3-naphthoic acid
2-hydroxy-1-naphthoic acid Cyclization of alpha-acetoxyethyl salicylate may be carried out as follows:

Alpha-acetoxyethyl salicylate (52 g., 0.25 mol) and 0.2 cc. of concentrated sulfuric acid were heated in a water bath held at 80° C. while acetic acid was removed as formed by distillation at 30 mm. through a Vigreux column. In three hours the material had lost 13.5 g. in weight (theory for 0.25 mol acetic acid, 15 g.). Distillation gave 33 g. of 2-methyl-4-keto-1,3-benzodioxane, B. P. 108° C. (3.0 mm.) which solidified at room temperature when seeded. The melting point was 32.5–33.0°.

In this example, the intermediate compound, alpha-acetoxyethyl salicylate is isolated from the reaction mixture before it is subjected to cyclization in the second step. Such isolation need not, however, be carried out, since I have found that the reaction mixture containing the intermediate may be directly subjected to the cyclization reaction merely by the addition of the acid catalyst at the completion of the reaction between the salicylic acid salt and chloromethyl acetate or alpha-chloroethyl acetate.

The compounds acetoxymethyl salicylate and alpha-acetoxyethyl salicylate, as well as the cyclization reactions by which these compounds are converted to the benzodioxanes not claimed herein, are claimed in my copending application Serial No. 677,912, filed June 19, 1946, now Patent No. 2,518,912, August 15, 1950.

What I claim is:

1. The process which comprises mixing salicylic acid with benzal diacetate and heating the mixture under reflux in the presence of an acidic substance and recovering 2-phenyl-4-keto-1,3-benzodioxane from the reaction mixture.

2. Compounds having the general formula:

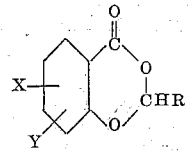

where X is selected from the group consisting of H, Cl, CH₃, NO₂, —OCH₃; Y is selected from the group consisting of H and CH₃; X and Y together are benzo; R is selected from the group consisting of CH₂=CH—, CH₃—CH=CH—, styryl, phenyl, chlorophenyl, nitrophenyl, methylene dioxyphenyl and furyl.

3. 2-phenyl-4-keto-1,3-benzodioxane.

4. 2 - (3',4' - methylenedioxyphenyl) - 4-keto-1,3-benzodioxane.

5. The process which comprises mixing a compound having the formula:

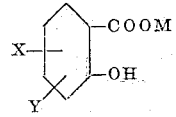

wherein X is selected from the group consisting of H, Cl, CH₃, NO₂ and OCH₃; Y is selected from the group consisting of H, and CH₃, and X and Y together are benzo, M is selected from the group consisting of sodium and hydrogen, with an acetate having the formula:

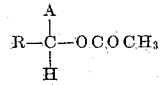

wherein R is selected from the group consisting of H, CH₃, CH₂=CH—, CH₃—CH=CH—, φCH=CH—, φ, Clφ, NO₂φ, methylene dioxyphenyl and furyl, and A is selected from the group consisting of Cl and —OCOCH₃ and then heating the mixture under reflux in the presence of an acidic substance.

DAVID T. MOWRY.

REFERENCES CITED

The following references are of record in the file of this patent:

UNITED STATES PATENTS

| Number | Name | Date |
| --- | --- | --- |
| 2,047,675 | Dupont | July 14, 1936 |
| 2,396,994 | Filachione et al. | Mar. 19, 1946 |
| 2,409,134 | Lecher et al. | Oct. 8, 1946 |

OTHER REFERENCES

Wallach: Annalen des Chemie, v. 193, 1878, pp. 41, 42, 60 and 61.

Chattaway et al.: Chemical Abstracts, v. 26, 1932, pp. 462–463.